2 Sheets—Sheet 1.

J. S. ADAMS,

Assignor to THE ELGIN TUBULAR IRON TOWER COMPANY.

TOWER FOR WINDMILLS.

No. 10,292. Reissued Mar. 6, 1883.

Witnesses:

Frank S. Blanchard

William C. Whiting

Inventor:

John S. Adams

By Jno. G. Elliott

Attorney.

2 Sheets—Sheet 2.

J. S. ADAMS,

Assignor to THE ELGIN TUBULAR IRON TOWER COMPANY.

TOWER FOR WINDMILLS.

No. 10,292. Reissued Mar. 6, 1883.

Witnesses:

Frank S. Blanchard.

William A. Whiting

Inventor:

John S. Adams

By Jno. G. Elliott

Attorney.

UNITED STATES PATENT OFFICE.

JOHN S. ADAMS, OF ELGIN, ILLINOIS, ASSIGNOR TO THE ELGIN TUBULAR IRON TOWER COMPANY, OF SAME PLACE.

TOWER FOR WINDMILLS.

SPECIFICATION forming part of Reissued Letters Patent No. 10,292, dated March 6, 1883.

Original No. 187,078, dated February 6, 1877. Application for reissue filed November 7, 1881.

*To all whom it may concern:*

Be it known that I, JNO. S. ADAMS, a citizen of the United States, residing in Elgin, county of Kane, and State of Illinois, have invented certain new and useful Improvements in Towers, which are hereinafter set forth as applied to a windmill, of which the following is a specification.

Prior to my invention towers have been constructed of heavy and cumbersome angle-iron, and with four or more sides, and a large number of braces, requiring numerous bolts and nuts to secure them in position and great skill to properly regulate their tension. The effect of such construction is to render the towers very costly, both by reason of the quantity of iron and the time and skill required to make the various parts and put them together. Furthermore, they require very solid and generally costly foundations to support their immense weight, and when up obstruct the view, present an unsightly appearance and a large area of surface to the wind.

The objects of my invention are to avoid these objections by entirely dispensing with angle-irons and their immovable and necessary adjuncts; to reduce the number of sides of the tower to three; to have a more open tower presenting less surface to the wind; to reduce the number and simplify the parts and use comparatively cheap materials, requiring very little skill to put together and give them the desired strain, and at the same time produce a tower of maximum strength and rigidity by the use of a minimum of metal; to provide a series of diagonal braces and novel means for connecting them together and regulating their tension upon the standards or tower-frame; to provide novel construction of removable, adjustable, and self-locking steps adapted to be connected with the standards of and for convenience in ascending and descending the tower; to center the pump-rod of a windmill by devices connected to the standards of the tower; and, finally, to provide a novel means for connecting the various parts of the tower together and with each other. I attain these objects by devices illustrated in the accompanying drawings, in which—

Figure 1:
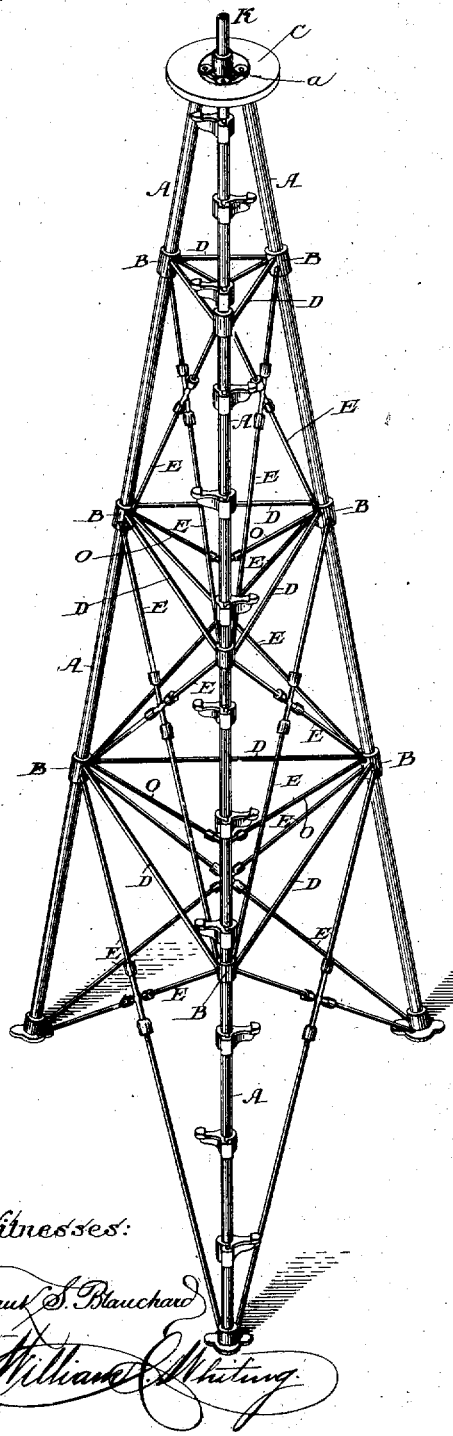
Figure 2:
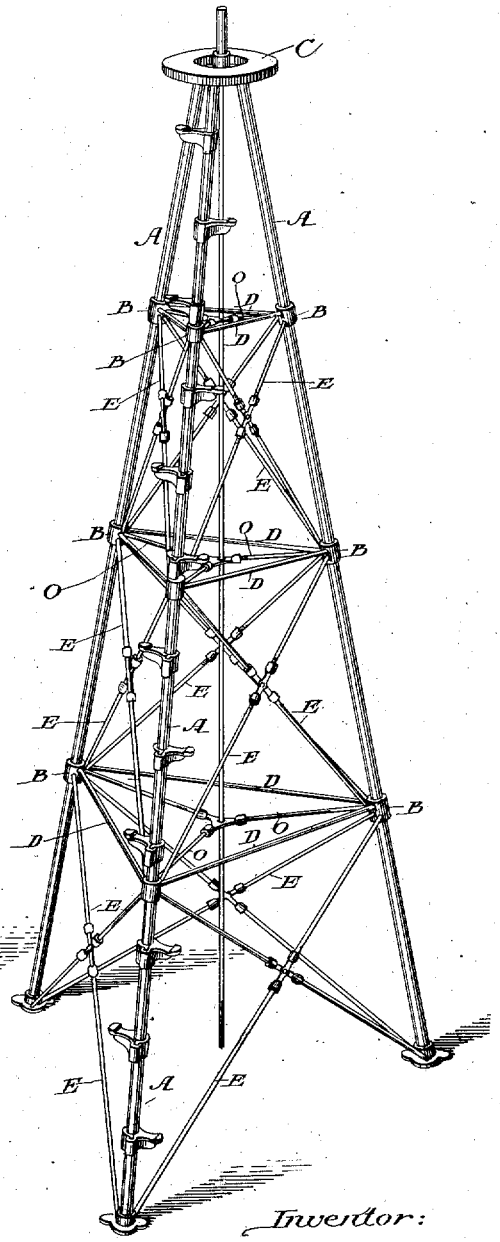
Figure 3:
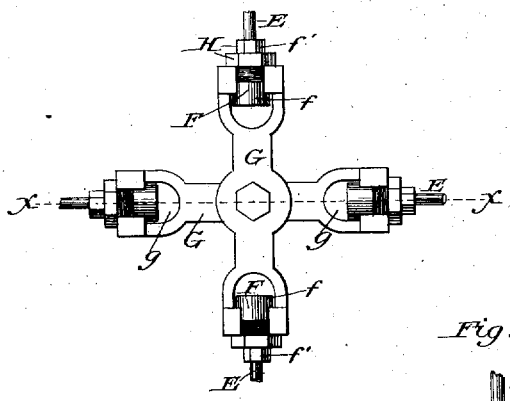
Figure 4:
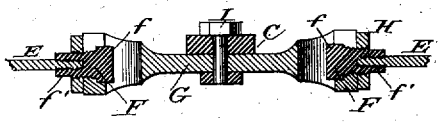
Figure 5:
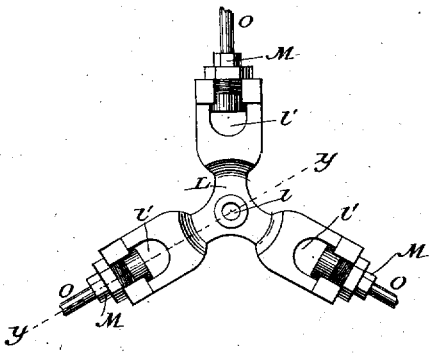
Figure 7:
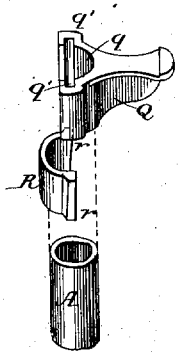
Figure 6:
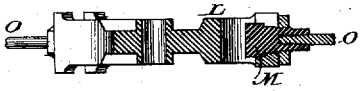
Figure 8:
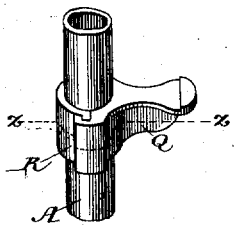
Figure 9:
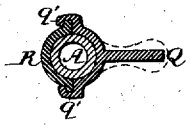

Figure 1 is a perspective of a tower embodying my invention; Fig. 2, a similar view of the same, showing the pump-rod centered and extending down through the middle of the tower; Fig. 3, a plan view of the intersecting portions of two of the diagonal side braces; Fig. 4, a section of the same on the line *x x* of Fig. 3; Fig. 5, a plan view of one of the central guides for the operating-rod of a pump; Fig. 6, a section of the same on the line *y y* of Fig. 5; Fig. 7, a perspective view of the parts of my self-locking step separated from each other and from the standard; Fig. 8, a similar view of the same in position upon the standard, and Fig. 9 a section on the line *z z* of Fig. 8.

Similar letters of reference indicate the same parts in the several figures of the drawings.

A A A represent three upright standards, consisting of sections of tubing connected together by couplings B in any number to give the desired height of tower, and secured to base-plates or other firm supports at substantially the corners of a triangle. These standards converge gradually along their length toward their upper end, where they are screwed through a triangular plate, *a*, and are connected together at intervals of their length by horizontal tubes D extending between the couplings and screw-threaded to enter the same. Extending diagonally from the series of couplings in the same horizontal plane to the next series of couplings are tubes E, which serve as braces to insure the relative positions of the standards—that is, to secure, maintain, and hold them in place and to increase the strength of the structure. In order that the length of the diagonal braces may be varied at will for these purposes, and to increase or diminish their tension as described or necessary, said braces are divided into two parts, and the inner end of each portion threaded and fitted into a threaded sleeve, F, which sleeve is provided at its inner end with an enlargement or head, *f*, is threaded upon the central portion of its periphery, and at its inner end is squared to receive a wrench. A metal block, G, having the general form shown in Fig. 3, is provided at each end with a recess, *g*, which is open at one side, and receives the head *f* and body *f'* of the sleeve F, said sleeve fitting with sufficient looseness to prevent of its free rotation, while its said head, engaging with a corresponding shoulder, prevents the withdrawal longitudinally of said sleeve. A nut, H, fitted over the threaded portion of the exterior of the sleeve F, may be caused to bear firmly against the end of the block G and bind said sleeve in place when desired. When the braces E, connected as described, are in place, by rotating the sleeves F said braces may be drawn toward the center, so as to increase their tension, or may be slackened and their tension decreased. A bolt, I, passing through the center of the blocks G, confines the same in relative position, and operates as a pivotal bearing.

It will here be noted that from the nature of the material used and the means employed to put the parts together such a tower will be much lighter in weight than a tower of angle-iron, will require less time and expense to put it together, and when up present less surface to the wind and obstruction to view than a tower constructed of angle-iron or wood; that when once in position and its parts properly adjusted this tower will possess all the required strength and rigidity necessary to support the mechanism which it is desired to maintain in an elevated position, and to withstand the severest tests of wind and weather to which it may be subjected in the ordinary course of events.

The triangular arrangement of the standards peculiarly adapts them to receive and utilize the full effects of trussing by horizontal or diagonal braces, and the result is not only the saving of metal, but the tower possesses greater strength, and is more rigid to resist a change of form in its cross-section than one of four or more sides, even though its parts and connections be of the same construction and material.

To adapt my tower for supporting windmill mechanism, an open plate or platform, C, is secured to or upon the converging and top ends of the standards; and centrally secured therein to the plate *a* is a vertical tube, K, upon or around which the windmill is placed for support, the pump-rod of the same passing through the tube.

Guides for the pump-rod are provided at suitable points between the upper and lower ends of the tower, which guides consist of a three-armed block, L, that is provided with a central opening, *l*, for the passage of said rod, and within the end of each arm has a recess, *l'*, which recess receives a sleeve, M, that has a head, *m*, threaded exterior and interior, a squared outer end, and a nut, *n*, like the sleeve F. Each sleeve M receives the threaded end of a brace rod or tube, O, that from thence extends horizontally outward to the adjacent coupling B, within which latter the threaded end of said brace is contained.

By means of the sleeves M the guide-block L can be adjusted horizontally until its central opening, *l*, is exactly in a line with the openings in the other guides and with the interior of the tube K.

In order that proper facilities may be afforded for ascending the tower for the purpose of oiling, repairing the mechanism, &c., supported by it, a series of steps, Q, are attached to or upon one of the standards at suitable points between its upper and lower ends. As seen in Fig. 7, the inner end of the step Q is provided with a half-round bearing, *q*, which corresponds to and embraces one side of the standard A, while from the rear portion of said bearing, at each side, a lip extends laterally outward, rearward, and then inward, so as to form a vertical groove, *q'*, that has right angles in horizontal section and opens inward.

Upon the rear side of the standard A is placed a cap, R, which corresponds in shape therewith, and at its ends is provided with radial lugs *r*, that correspond to and fit within the grooves *q'* of the step Q. As seen in Fig. 7, the lugs *r* have a downward and slight rearward inclination, so that when the step Q is placed over their upper ends and pressed downward the rearward inclination of said lugs causes the cap R and said step to be drawn together and clasp the standard A with sufficient force to insure the position thereon of said step, and to enable the latter to sustain any desired weight. To remove the step Q it is only necessary that it be driven upward until released from engagement with the cap R; but it is not necessary to absolutely detach these parts to slide them along for the purpose of adjusting the height of the step upon the standard. It will here be observed that these steps, when adjusted to place, have no tendency to become accidentally detached when in use; but, on the contrary, the weight of a person has the effect of tightening them on the standards.

Having thus fully described my invention, what I claim, and desire to secure by Letters Patent, is—

1. In a tower, the combination, with the standards, consisting of sections of tubing screw-threaded and connected together, of screw-threaded horizontal braces connecting said standards, substantially as described.

2. The combination of the standards, consisting of screw-threaded sections of tubing, with tubular screw-threaded horizontal braces connecting said standards, substantially as described.

3. The combination, with the standards of a tower, of adjustable and sectional diagonal braces connected at their intersections by a coupling plate or ring, substantially as described.

4. The combination, with the standards, constructed in sections, the screw-threaded couplings, and the horizontal braces, of diagonal braces, substantially as described.

5. The hereinbefore-described tower, composed of the standards A, constructed in sections and united by screw-threaded couplings B, the top plate, C, the horizontal braces D, and the diagonal braces E, said parts being combined substantially as described.

6. The combination, with the braces E, threaded at their inner ends, the sleeves F *f*, and blocks G *g*, substantially as described.

7. The combination, with the braces O, threaded at their inner ends, and having their outer ends connected to or with the couplings B, of the three-cornered block L *l l'*, and the sleeves M *m*, substantially as described.

8. The combination, with the standard of a tower, of a two-part step removably and adjustably connected with said standard, substantially as described.

9. The combination, with the standard of a tower, of a two-part step having one of its parts grooved and the other provided with corresponding lugs fitting in said grooves, substantially as described.

10. In combination, with the standard A, the step Q, provided with the half-round bearing *q* and grooves *q'*, and the cap R, having a half-round recessed face and radial lugs *r*, substantially as described.

JOHN S. ADAMS.

Witnesses:
JNO. G. ELLIOTT,
WILLIAM C. WHITING.